(12) United States Patent
Masaki et al.

(10) Patent No.: US 11,192,291 B2
(45) Date of Patent: Dec. 7, 2021

(54) MANUFACTURING APPARATUS AND MANUFACTURING METHOD FOR SHAFT-SHAPED COMPOSITE MEMBER

(71) Applicant: HONDA MOTOR CO., LTD., Tokyo (JP)

(72) Inventors: Seijiro Masaki, Wako (JP); Atsushi Yokoyama, Yokohama (JP); Kazuhiro Taneda, Wako (JP); Hiroshi Kiyomoto, Wako (JP); Nobuhiro Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 16/182,976

(22) Filed: Nov. 7, 2018

(65) Prior Publication Data

US 2019/0134885 A1    May 9, 2019

(30) Foreign Application Priority Data

Nov. 9, 2017 (JP) .............................. JP2017-216263

(51) Int. Cl.
*B29C 63/00* (2006.01)
*B29C 63/24* (2006.01)
(Continued)

(52) U.S. Cl.
CPC ...... *B29C 63/0073* (2013.01); *B29C 63/0004* (2013.01); *B29C 63/0069* (2013.01);
(Continued)

(58) Field of Classification Search
CPC . B29C 63/0073; B29C 63/0069; B29C 63/14; B29C 63/24; B29C 63/0004;
(Continued)

(56) References Cited

U.S. PATENT DOCUMENTS 5,468,327 A * 11/1995 Pawlowicz .............. D04C 1/02
156/393
7,252,028 B2 * 8/2007 Bechtold ................. D04C 3/48
87/34
(Continued)

FOREIGN PATENT DOCUMENTS

JP   2009-137062 A   6/2009
JP   2015-145104 A   8/2015
(Continued)

OTHER PUBLICATIONS

Office Action dated Jun. 18, 2019 issued over the corresponding Japanese Patent Application No. 2017-216263 with the English translation thereof.

*Primary Examiner* — Marc C Howell
*Assistant Examiner* — Abhishek A Patwardhan
(74) *Attorney, Agent, or Firm* — Carrier Blackman & Associates, P.C.; Joseph P. Carrier; William D. Blackman (57) ABSTRACT

A core metal includes, on an outer circumference thereof, a plurality of attachment surfaces to which a plurality of strings are attached, and a plurality of guided portions are formed along an axial direction of the core metal and disposed between two of the attachment surfaces. A string supply device includes a string supply unit that supplies the strings to the outer circumference of the core metal, an attaching unit that arranges and attaches the strings on the attachment surfaces of the core metal in a circumferential direction of the core metal, and a plurality of guiding units, in contact with the guided portions of the core metal, which guides the core metal.

6 Claims, 9 Drawing Sheets

(51) Int. Cl.
*B29C 63/14* (2006.01)
*B29D 23/00* (2006.01)
*B29L 23/00* (2006.01)
*B29K 307/04* (2006.01)
*B29K 705/00* (2006.01)
*B29K 105/08* (2006.01)
*B29L 31/00* (2006.01)

(52) U.S. Cl.
CPC .............. *B29C 63/14* (2013.01); *B29C 63/24* (2013.01); *B29D 23/00* (2013.01); *B29K 2105/089* (2013.01); *B29K 2105/0881* (2013.01); *B29K 2307/04* (2013.01); *B29K 2705/00* (2013.01); *B29L 2023/004* (2013.01); *B29L 2031/75* (2013.01)

(58) Field of Classification Search
CPC .............. B29D 23/00; B29K 2105/089; B29K 2105/0881; B29K 2307/04; B29K 2705/00; B29L 2031/75; B29L 2023/004

USPC ........................................................ 156/242
See application file for complete search history.

(56) References Cited

U.S. PATENT DOCUMENTS

| | | | |
|---|---|---|---|
| 9,388,517 B2 * | 7/2016 | Lilburn | D04C 3/14 |
| 2010/0052203 A1 * | 3/2010 | Inazawa | D04C 3/48 |
| | | | 264/103 |
| 2010/0083815 A1 * | 4/2010 | Inazawa | D04C 3/48 |
| | | | 87/1 |

FOREIGN PATENT DOCUMENTS

| JP | 2016-055564 A | | 4/2016 |
|---|---|---|---|
| JP | 2016055564 A | * | 4/2016 |

* cited by examiner

MANUFACTURING APPARATUS AND MANUFACTURING METHOD FOR SHAFT-SHAPED COMPOSITE MEMBER

CROSS-REFERENCE TO RELATED APPLICATION

This application is based upon and claims the benefit of priority from Japanese Patent Application No. 2017-216263 filed on Nov. 9, 2017, the contents of which are incorporated herein by reference.

BACKGROUND OF THE INVENTION

Field of the Invention

The present invention relates to a manufacturing apparatus and a manufacturing method for a shaft-shaped composite member, that are employed for manufacturing a shaft-shaped composite member including a bent part by attaching a plurality of strings to a core metal.

Description of the Related Art

As a material of a shaft-shaped member such as a steering wheel, a tower bar, a suspension arm, or a stabilizer of a vehicle, or a handlebar of a bicycle, a composite material including a base material (matrix material) and a reinforcement material is used. A shaft-shaped member manufactured using the composite material is referred to as a shaft-shaped composite member. As the composite material, fiber reinforced resin materials (fiber reinforced plastic, FRP) have been used and above all, carbon fiber reinforced resin materials (carbon fiber reinforced plastic, CFRP) have been used more frequently. The fiber reinforced resin materials include a sheet type and a string type that are formed by impregnating the fiber with the matrix material. The former type is also referred to as prepreg, and the latter is also referred to as tow prepreg.

Japanese Laid-Open Patent Publication No. 2015-145104 discloses a technique of manufacturing a shaft-shaped composite member in a manner that string-shaped fiber reinforced resin materials are arranged in a circumferential direction of a core metal and attached densely all over an outer circumferential surface of the core metal along an axial direction of the core metal, and then thermally hardened. Japanese Laid-Open Patent Publication No. 2016-055564 discloses a technique of manufacturing a shaft-shaped composite member in a manner that string-shaped fiber reinforced resin materials are attached to cavities of a pair of dies to manufacture intermediate molded bodies, the intermediate molded bodies are combined with each other by combining the pair of dies, and then the fiber reinforced resin materials are thermally hardened.

SUMMARY OF THE INVENTION

According to the technique disclosed in Japanese Laid-Open Patent Publication No. 2015-145104, the core metal is left inside the shaft-shaped composite member, and therefore it is difficult to reduce the weight of the shaft-shaped composite member. According to the technique disclosed in Japanese Laid-Open Patent Publication No. 2016-055564, the shaft-shaped composite member that is hollow is manufactured by combining split members, and therefore the weight of the shaft-shaped composite member can be reduced. However, since it is necessary to manufacture the intermediate molded bodies individually in the technique disclosed in Japanese Laid-Open Patent Publication No. 2016-055564, it takes time and efforts to manufacture the shaft-shaped composite member.

The present invention has been made in view of the problems as above, and an object is to provide a manufacturing apparatus and a manufacturing method for a shaft-shaped composite member that can reduce the weight of the shaft-shaped composite member and improve work efficiency.

A manufacturing apparatus for a shaft-shaped composite member according to the present invention includes a core metal including a bent part, and a string supply device configured to supply a plurality of strings, and manufactures the shaft-shaped composite member including a bent part by attaching the strings to the core metal, wherein: the core metal includes, on an outer circumference thereof, a plurality of attachment surfaces to which the strings are attached, and a plurality of guided portions formed along an axial direction of the core metal and disposed between two of the attachment surfaces; and the string supply device includes a string supply unit configured to supply the strings to the outer circumference of the core metal, an attaching unit configured to arrange and attach the strings on the attachment surfaces of the core metal in a circumferential direction of the core metal, and a plurality of guiding units in contact with the guided portions of the core metal, configured to guide the core metal.

When the strings are attached to the core metal, the guiding units provided in the string supply device are in contact with the guided portions provided on the core metal, and guide the core metal. Each guiding unit also functions as a separator; therefore, the strings are attached to the attachment surfaces at an entire circumference of the core metal except the guided portions. By this manufacturing apparatus, first intermediate molded bodies of the shaft-shaped composite member are manufactured. Split lines to which the strings are not attached are formed from one end to the other end of the first intermediate molded bodies along an axial direction, and the first intermediate molded bodies can be split using the split lines as borders. In addition, after the core metal is removed from the first intermediate molded bodies, the first intermediate molded bodies can be combined to manufacture a second intermediate molded body that is hollow. Thus, by the above structure, since the core metal can be removed from the first intermediate molded bodies, the shaft-shaped composite member manufactured finally can be reduced in weight. In addition, by performing a step of attaching the strings to the core metal once, the first intermediate molded bodies can be manufactured and the first intermediate molded bodies are combined to manufacture the second intermediate molded body that is hollow. Accordingly, the work efficiency is high.

In the manufacturing apparatus for a shaft-shaped composite member according to the present invention, the guiding unit may be a guide pin with a tapered part that is tapered toward an end thereof, the guided portion may be a groove, and when the strings are attached to the core metal, the groove and the tapered part may be in contact with each other.

By the above structure, the tapered part of the guide pin can easily enter the groove and the space is not formed easily between the guiding unit and the guided portion. Therefore, portions (split lines) where the strings are not attached can be formed on the outer circumferential surface of the core metal.

In the manufacturing apparatus for a shaft-shaped composite member according to the present invention, the string supply unit may be configured to supply each string to the core metal at an individual speed.

By the above structure, when the strings are attached to the bent part of the core metal, the supply speed of the string to be attached to the outside of the bent part and the supply speed of the string to be attached to the inside of the bent part can be changed. Therefore, the bent part of the intermediate molded body and the bent part of the shaft-shaped composite member corresponding to a final product are not creased easily.

In the manufacturing apparatus for a shaft-shaped composite member according to the present invention, the strings may form a fiber reinforced resin material with adhesiveness, in which a long fiber tow including fiber filaments contains a matrix material.

By the above structure, the strings can be attached to the core metal without applying an adhesive or the like to the strings or the core metal. Since the strings that are adjacent are attached to each other, the shape of the intermediate molded bodies can be maintained even after the core metal is removed.

In the manufacturing apparatus for a shaft-shaped composite member according to the present invention, the attaching unit may include a guide hole into which the core metal and the strings are inserted, and the guiding units may protrude to a central direction from an edge of the guide hole.

By the above structure, the strings can be attached to the attachment surfaces of the core metal through a simple work of inserting the core metal into the guide hole. In addition, the portions (split lines) where the strings are not attached can be formed on the outer circumferential surface of the core metal.

The manufacturing apparatus for a shaft-shaped composite member according to the present invention may further include a support unit mounted on the string supply unit and configured to support the attaching unit below the string supply unit.

In the manufacturing apparatus for a shaft-shaped composite member according to the present invention, the string supply unit may include a plate material with an annular shape, and a plurality of restriction pins provided on an upper surface of the plate material, the plate material may include at a center, a circular hole that penetrates in a vertical direction, and the restriction pins may be provided on inner and outer edges of the upper surface, arranged in a line along a circumferential direction of the plate material, and gather the strings supplied from outside the plate material into the hole.

A manufacturing method for a shaft-shaped composite member according to the present invention uses a core metal including a bent part, and a string supply device configured to supply a plurality of strings, and manufactures the shaft-shaped composite member including a bent part by attaching the strings to the core metal, the manufacturing method including the steps of: manufacturing a plurality of first intermediate molded bodies by arranging the strings in a circumferential direction of the core metal and attaching the strings to a plurality of attachment surfaces of the core metal along an axial direction of the core metal, and forming split lines where the strings are not attached between the attachment surfaces that are adjacent to each other along the axial line of the core metal; releasing each of the first intermediate molded bodies from the core metal using the split lines as borders; manufacturing a second intermediate molded body by combining the first intermediate molded bodies; and forming the shaft-shaped composite member by pressurizing and heating the second intermediate molded body for hardening.

By the above structure, since the core metal can be removed from the intermediate molded bodies, the shaft-shaped composite member manufactured finally can be reduced in weight. In addition, by performing the step of attaching the strings to the core metal once, the first intermediate molded bodies can be manufactured and the first intermediate molded bodies are combined to manufacture the second intermediate molded body that is hollow. Accordingly, the work efficiency is high.

By the present invention, the shaft-shaped composite member can be reduced in weight. In addition, the shaft-shaped composite member can be manufactured efficiently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a manufacturing apparatus and a manufacturing method for a shaft-shaped composite member according to the present invention is hereinafter described in detail with reference to the attached drawings.

[1. Structure of Manufacturing Apparatus 100 for Shaft-Shaped Composite Member 76]

Figure 1:
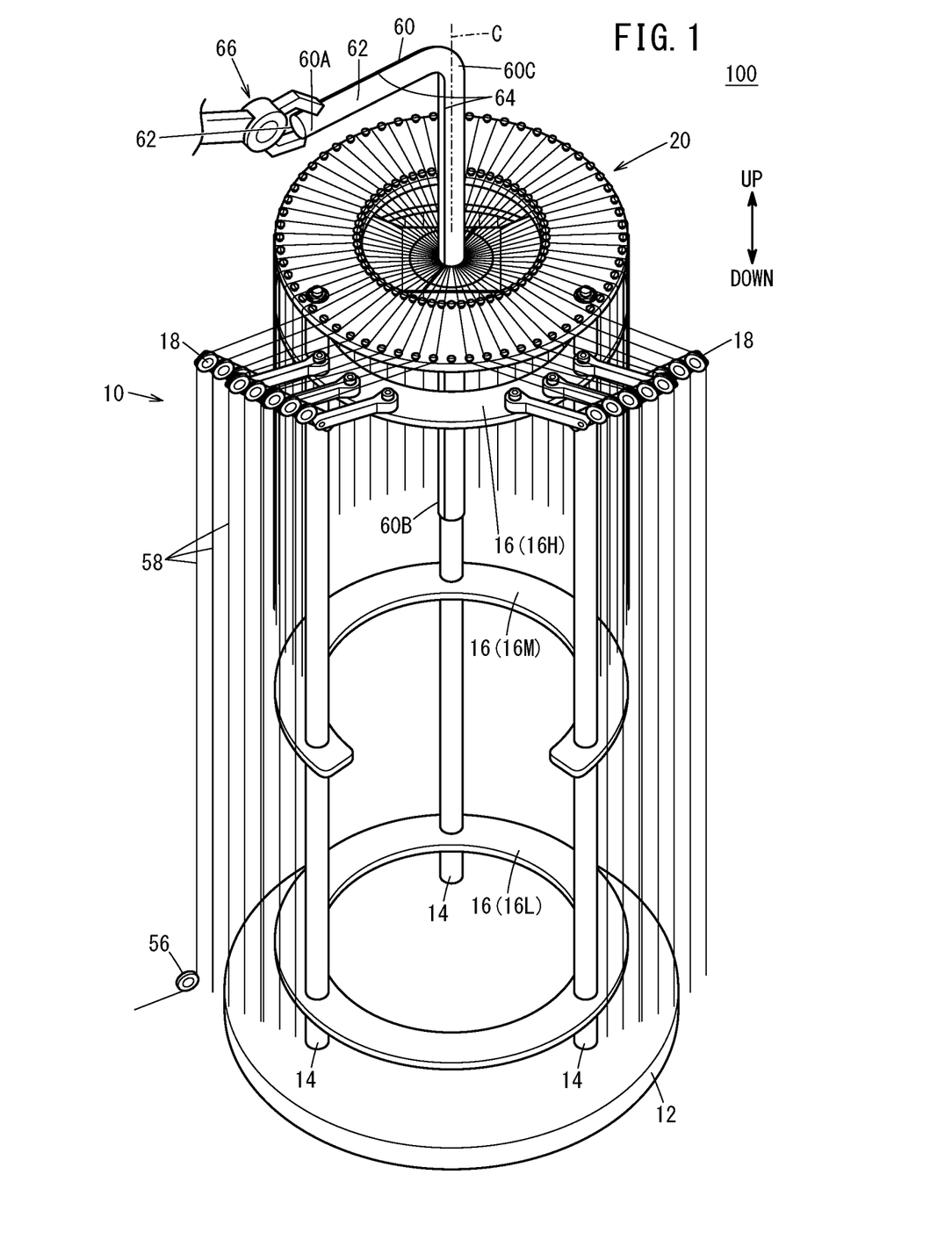
FIG. 1 illustrates a manufacturing apparatus of a shaft-shaped composite member according to one embodiment.

As illustrated in FIG. 1, a manufacturing apparatus 100 for a shaft-shaped composite member 76 (FIG. 8) according to the present embodiment (this apparatus is hereinafter simply referred to as manufacturing apparatus 100) includes a core metal 60 including a bent part 60C, a string supply device 10 that supplies a plurality of strings 58, and a core metal movement device 66 that moves the core metal 60.

The string supply device 10 includes a table 12, three props 14 provided to extend upward from the table 12, three gap holding members 16 (16L, 16M, 16H) provided at a lower part, a middle part, and an upper part of each prop 14, a plurality of arms 18 mounted on the upper gap holding member 16H, a processing unit 20 mounted on an upper end of each prop 14, and a plurality of bobbins 56 around each of which the string 58 is wound in advance. Note that FIG. 1 illustrates only one bobbin 56 and the other bobbins 56 are omitted.

The lower gap holding member 16L and the upper gap holding member 16H are annular members, and the middle gap holding member 16M is a C-like member in which a part of an annular shape is removed. Each gap holding member 16 has penetration holes at the same positions in order to hold the three props 14 with a constant gap therebetween in a horizontal direction, and through the penetration hole, each prop 14 penetrates in a vertical direction. The lower gap holding member 16L is fixed to the lower part of the three props 14, the middle gap holding member 16M is fixed to the middle part of the three props 14, and the upper gap holding member 16H is fixed to the upper part of the three props 14.

The reason why only the middle gap holding member 16M has the C-like shape is as follows. If the middle gap holding member 16M is a perfect annular shape, when the string 58 is attached to the bent part 60C of the core metal 60, an end 60B of the core metal 60 on the lower side may be caught by the middle gap holding member 16M. On the other hand, if the middle gap holding member 16M is the C-like member in which a part of the annular shape is removed, the end 60B of the core metal 60 on the lower side can be escaped from between both ends of the middle gap holding member 16M to an outward direction of the string supply device 10 (radial direction from a central axis C of the string supply device 10).

The arms 18 are provided in order to adjust route positions of the strings 58 from the bobbins 56 to the processing unit 20. The arm 18 adjusts the route of the string 58 so as to leave an area open that is opposed to the removed part of the middle gap holding member 16M from the annular shape.

Around the bobbin 56, one string 58 is wound. The bobbin 56 is rotatably supported by a support device that is not shown, so that the string 58 can be drawn out as the string 58 is pulled. The bobbins 56 can be rotated individually without being influenced by the rotation of another bobbin 56. Therefore, the strings 58 can be drawn out at different speeds from the bobbins 56.

The string 58 is a fiber reinforced resin material in which a long fiber tow formed by binding a plurality of fiber filaments is impregnated with a matrix material such as resin, and has adhesiveness. For example, the fiber of the string 58 is carbon fiber.

Figure 2:
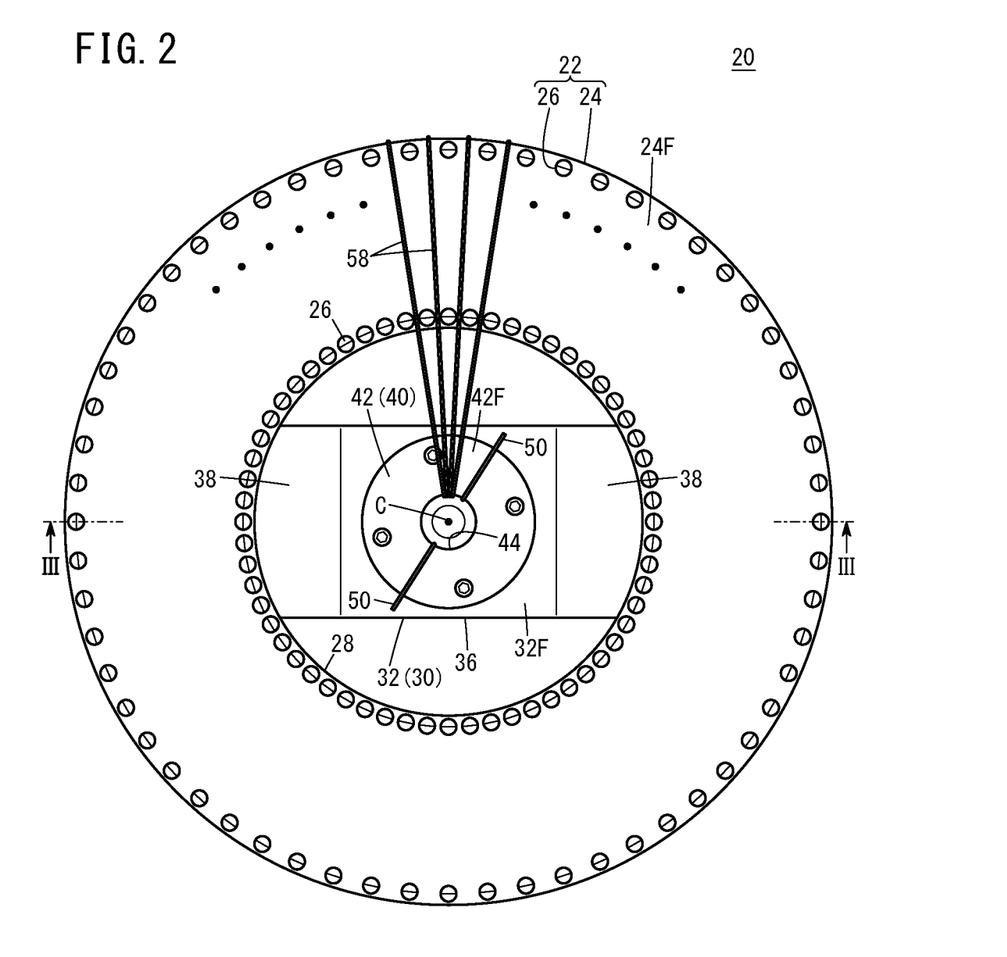
FIG. 2 is a plan view of a processing unit of a string supply device.
Figure 3:
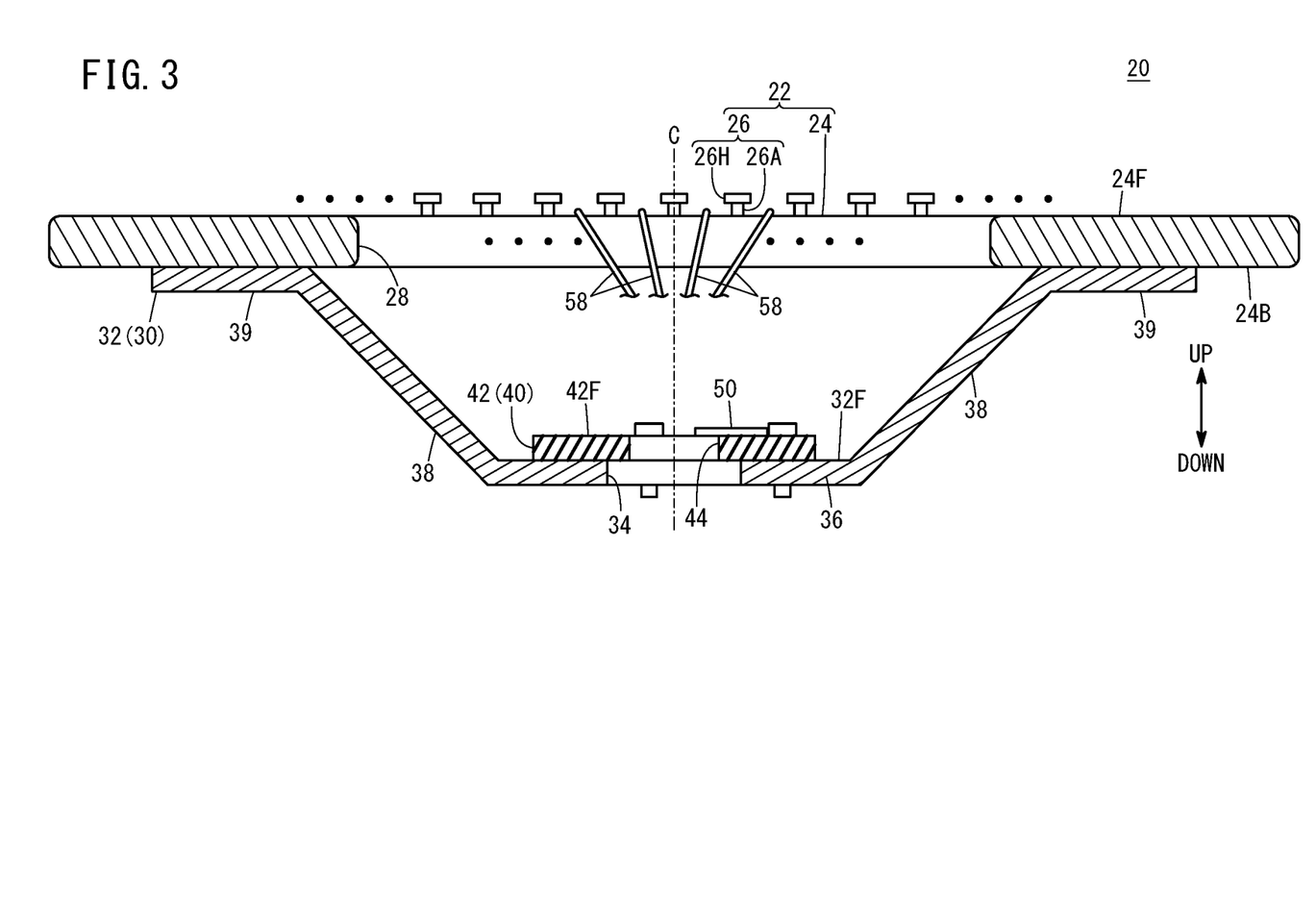
FIG. 3 is a cross-sectional view taken along line III-III in FIG. 2.

As illustrated in FIG. 2 and FIG. 3, the processing unit 20 includes a string supply unit 22 that is directly mounted on upper ends of the props 14, a support unit 30 that is mounted on a lower part of the string supply unit 22, an attaching unit or attacher 40 that is mounted on an upper part of the support unit 30, and a plurality of guiding units or guides 50 that is mounted on an upper part of the attaching unit 40.

The string supply unit 22 has a function of gathering the strings 58 drawn out from the bobbins 56 and supplying the strings 58 to the core metal 60. As illustrated in FIG. 2, the string supply unit 22 includes a first plate material 24 with an annular shape, and a plurality of restriction pins 26 provided on a first upper surface 24F of the first plate material 24. The first plate material 24 is formed of metal or resin, and includes at a center, a first hole 28 with a circular shape that penetrates in the vertical direction. A center of the first hole 28 exists on the central axis C of the string supply device 10. The first plate material 24 may have a flat shape as a whole, a convex shape that protrudes upward as getting closer to the first hole 28, or a convex shape that protrudes downward as getting closer to the first hole 28. The restriction pins 26 are provided at inner and outer edges of the first upper surface 24F, and are arranged in a line along a circumferential direction of the first plate material 24. The number of restriction pins 26 arranged on the inner edge and the number of restriction pins 26 arranged on the outer edge are the same. The restriction pin 26 is provided at every predetermined angle around the central axis C. The corresponding inner and outer restriction pins 26 constitute a pair, and the restriction pins 26 in one pair are arranged along one radial direction starting from the central axis C.

The restriction pins 26 have a function of gathering the strings 58 supplied from the bobbin 56 toward the first hole 28, and at the same time restricting the moving range of the strings 58 so that the strings 58 do not deviate in the horizontal and vertical directions on the first plate material 24. As illustrated in FIG. 3, the restriction pin 26 includes a shaft part 26A connected to the first plate material 24, and a head part 26H larger in diameter than the shaft part 26A. The shaft part 26A restricts the horizontal deviation of the string 58. The head part 26H restricts the vertical deviation of the string 58.

The support unit 30 has a function of supporting the attaching unit 40. As illustrated in FIG. 3, the support unit 30 includes a second plate material 32 with a convex shape that protrudes downward. The second plate material 32 is formed of metal or resin, and includes at a center, a second hole 34 with a circular shape that penetrates in the vertical direction. A center of the second hole 34 exists on the central axis C of the string supply device 10. The second hole 34 is smaller in diameter than the first hole 28. The second plate material 32 includes a central part 36 where the second hole 34 is formed, two intermediate parts 38 that extend outward and upward to a first lower surface 24B of the first plate material 24 from both ends of the central part 36, and two fixed parts 39 that extend outward from one end of each intermediate part 38 along the first lower surface 24B of the first plate material 24. One fixed part 39 and the other fixed part 39 are fixed on the first lower surface 24B of the first plate material 24 so as to face each other through the first hole 28.

The attaching unit 40 has a function of attaching the strings 58 to the core metal 60. As illustrated in FIG. 2 and FIG. 3, the attaching unit 40 includes a guide plate 42 with an annular shape. The guide plate 42 is formed of resin or rubber, and includes at a center, a guide hole 44 with a circular shape that penetrates in the vertical direction. The resin or rubber may be flexible. A center of the guide hole 44 exists on the central axis C of the string supply device 10. The guide hole 44 is smaller in diameter than the first hole 28 and the second hole 34. In addition, the diameter of the guide hole 44 is smaller than the total of the diameter of the core metal 60 and the diameters of two strings 58 so that the strings 58 are attached by applying pressure to an attachment surface 62 of the core metal 60 to be described below. The diameter of the guide hole 44 may be changed depending on the number of strings 58 (density of strings 58) or the thickness of the string 58 after the attachment by pressure (outer shape of first intermediate molded body 70 or shaft-shaped composite member 76). The guide plate 42 is fixed to a second upper surface 32F of the central part 36 of the second plate material 32 with a bolt and a nut.

The guiding units 50 have a function of guiding the core metal 60 when the core metal 60 is moved down in the processing unit 20, and also have a function of providing a place where the string 58 is not attached to the core metal 60. The guiding unit 50 is a guide pin formed of resin or rubber and including a tapered part 52 (FIG. 4) that is tapered to an end. The guiding unit 50 is fixed to a guide plate upper surface 42F so that the end of the guiding unit 50 protrudes from an edge of the guide hole 44 toward the central axis C and a longitudinal direction of the guiding unit 50 is parallel to the radial direction of the guide plate 42. The guiding units 50 are arranged along a circumferential direction of the attaching unit 40. Between the two adjacent guiding units 50, a gap within 180 degrees is provided. In the present embodiment, the two guiding units 50 are provided with a gap of 180 degrees.

Figure 4:
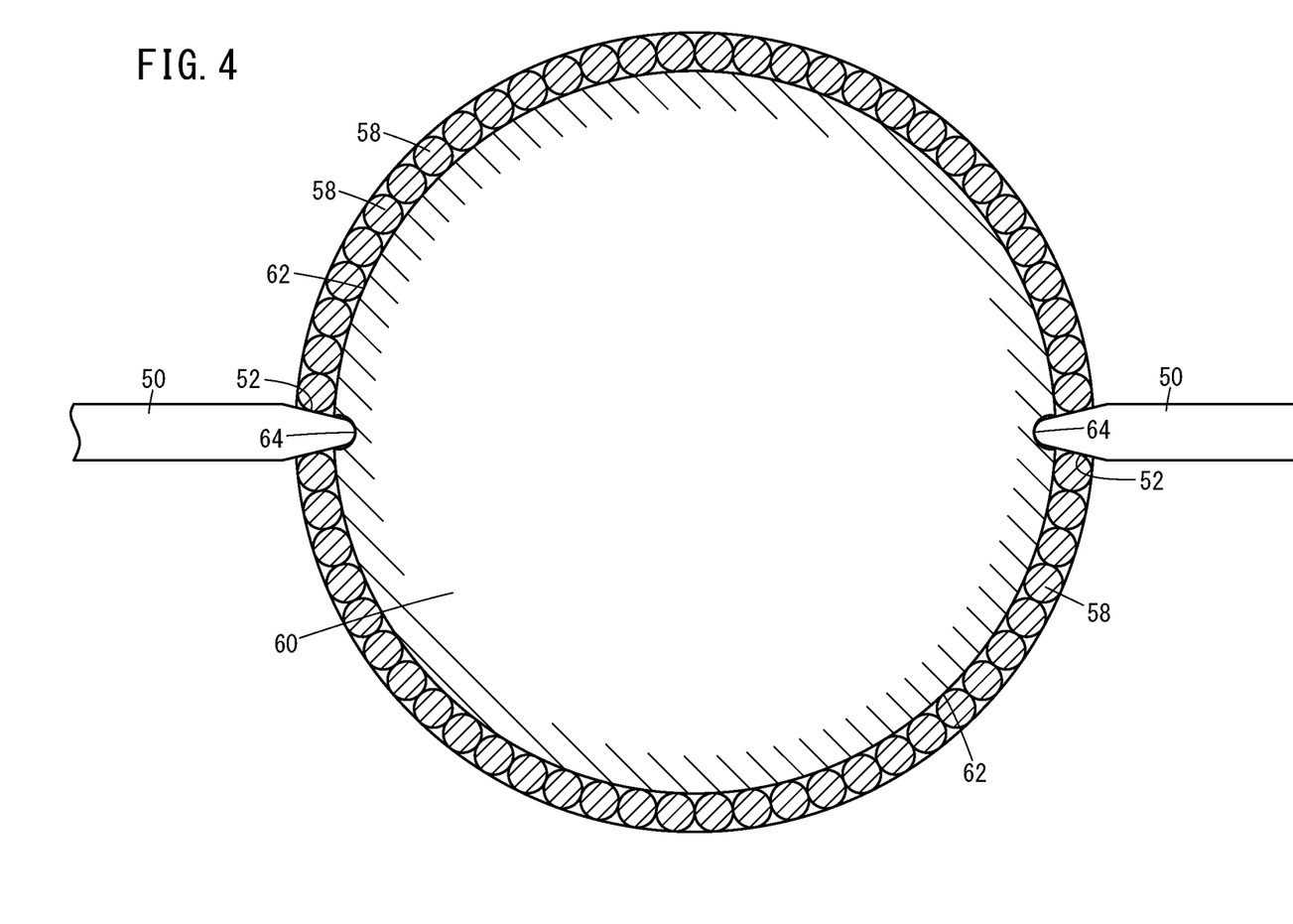
FIG. 4 is a diagram for describing a guiding unit and a guided portion.

The core metal 60 is described with reference to FIG. 1, FIG. 4, FIG. 5A, and FIG. 5B. As illustrated in FIG. 1, the core metal 60 is the shaft-shaped metal member with the bent part 60C, and is a die for the shaft-shaped composite member 76 (and shaft-shaped composite member 76'). The core metal 60 includes the plurality of attachment surfaces 62 and a plurality of guided portions 64 along an outer circumference. The attachment surfaces 62 correspond to an outer circumferential surface of the core metal 60, and as the attachment surfaces 62 pass the guide hole 44 of the attaching unit 40, the strings 58 are attached to the attachment surfaces 62. The guided portions 64 are formed on the outer circumferential surface of the core metal 60 along the axial direction of the core metal 60, and are positioned between the attachment surfaces 62. As illustrated in FIG. 4, when the core metal 60 is viewed along the cross section that is orthogonal to the axis, gaps within 180 degrees are provided between the two adjacent guided portions 64. The guided portions 64 are disposed in accordance with the arrangement of the guiding units 50 fixed to the attaching unit 40.

Figure 5A:
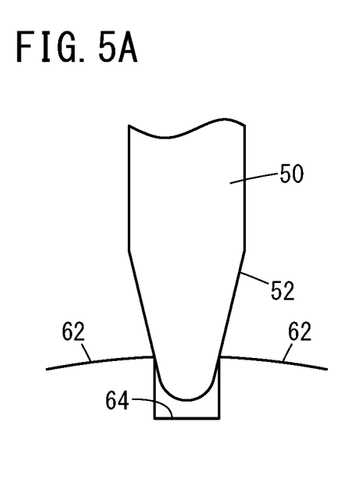
FIG. 5A and FIG. 5B are diagrams each for describing a shape of the guided portion.
Figure 5B:
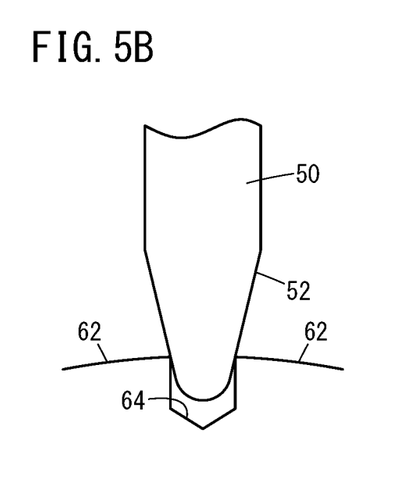

In the present embodiment, the guided portion 64 is a groove into which a part (tapered part 52) of the guiding unit 50 is inserted. The cross-sectional shape of the groove may be the same as that of the tapered part 52 or a polygonal shape as illustrated in FIG. 5A and FIG. 5B. Alternatively, a curved shape that is not shown may be employed. When the core metal 60 passes the guide hole 44 of the attaching unit 40, the groove is in contact with the tapered part 52 of the guiding unit 50 partially or entirely.

Figure 6:
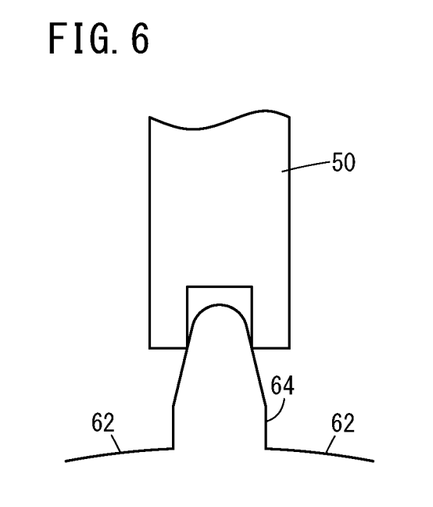
FIG. 6 is a diagram for describing a guiding unit and a guided portion that are different from those in FIG. 4.

In the present embodiment described here, the concave part is formed as the guided portion 64 of the core metal 60 and the convex part is provided on the guiding unit 50 of the string supply device 10; however, the convex part may be formed as the guided portion 64 of the core metal 60 and the concave part may be provided in the guiding unit 50 of the string supply device 10 as illustrated in FIG. 6.

The core metal movement device 66 illustrated in FIG. 1 is an industrial robot that inserts the core metal 60 into the guide hole 44 of the attaching unit 40 while gripping one end 60A of the core metal 60. The core metal movement device 66 learns an operation of moving the core metal 60 by teaching, and reproduces the learned operation when attaching the string 58 to the core metal 60.

[2. Manufacturing Method for Shaft-Shaped Composite Member 76]

[2. 1. Manufacturing Method 1]

A manufacturing method for the shaft-shaped composite member 76 using the manufacturing apparatus 100 is described with reference to FIG. 7 and FIG. 8.

Figure 7:
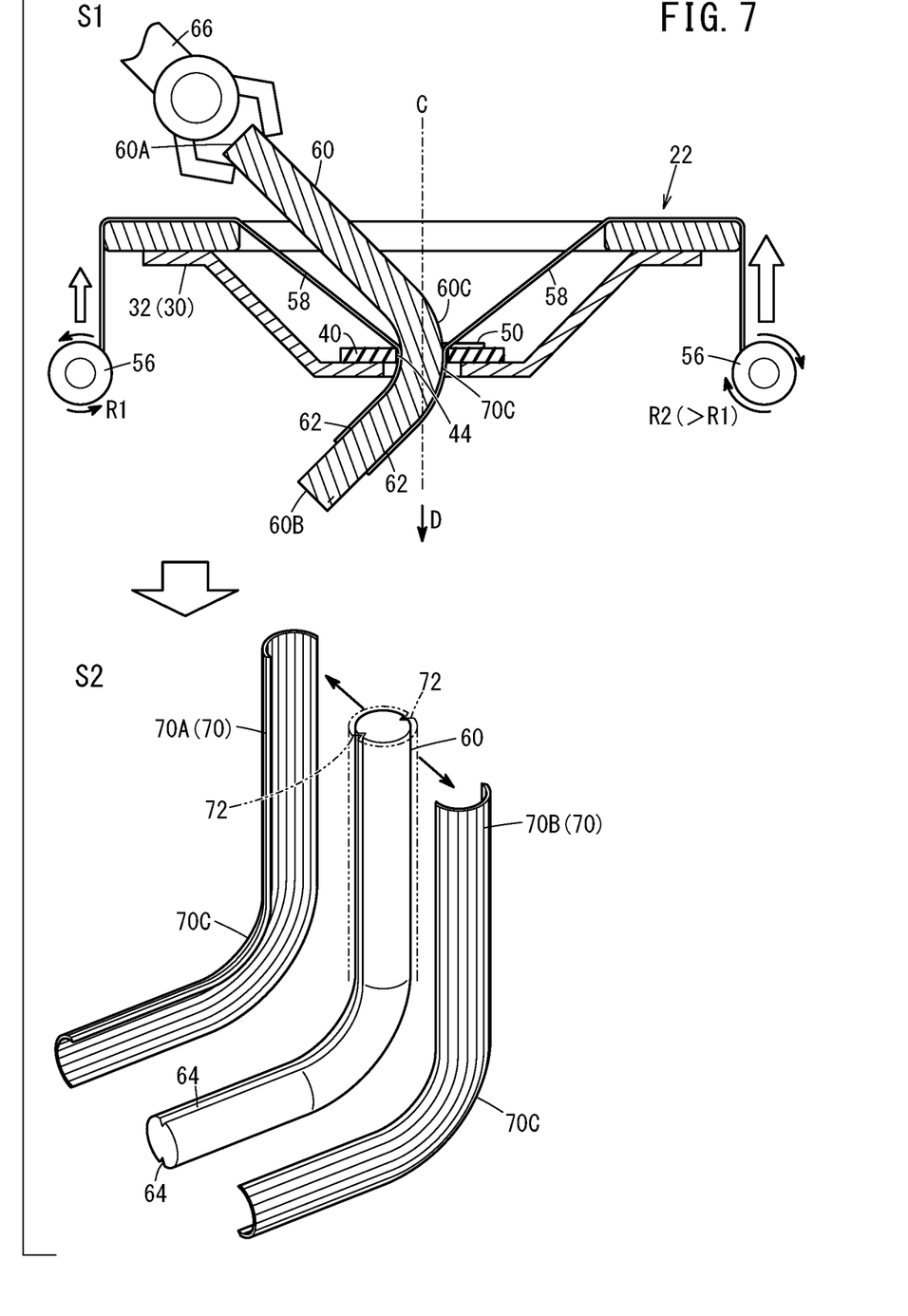
FIG. 7 is a diagram for describing steps for manufacturing a first intermediate molded body by using the manufacturing apparatus for a shaft-shaped composite member illustrated in FIG. 1.

In step S1 illustrated in FIG. 7, the core metal movement device 66 grips the one end 60A of the core metal 60 and inserts the other end 60B of the core metal 60 into the guide hole 44, and then moves the core metal 60 in a direction of an arrow D (downward). Here, the core metal movement device 66 adjusts the posture of the core metal 60 so that an axis of the core metal 60 substantially coincides with the central axis C of the string supply device 10 at the position of the guide hole 44.

The string supply unit 22 gathers the strings 58 drawn out from the bobbins 56 and supplies the strings 58 to the guide hole 44. The gathered strings 58 are arranged on the inner circumferential side of the attaching unit 40 and inserted into the guide hole 44. When the core metal 60 passes the guide hole 44, the attaching unit 40 arranges the strings 58 in the circumferential direction of the core metal 60 and at the same time, attaches the strings 58 by applying pressure on the attachment surfaces 62 along the axial direction of the core metal 60. As the core metal 60 is moved in the direction of the arrow D, the string 58 is drawn out from each bobbin 56. When the core metal 60 is moved, the guiding units 50 guide the core metal 60 downward while the guiding units 50 are brought into contact with the guided portions 64 of the core metal 60 as illustrated in FIG. 4. As a result, split lines 72 (see step S2) where the strings 58 are not attached are formed between the adjacent attachment surfaces 62 along the axial direction of the core metal 60.

When the bent part 60C of the core metal 60 passes the guide hole 44, the passing speed on the outside of the bent part 60C is higher than that on the inside of the bent part 60C. Therefore, a rotating speed R2 of the bobbin 56 that supplies the string 58 to the outside of the bent part 60C is higher than a rotating speed R1 of the bobbin 56 that supplies the string 58 to the inside of the bent part 60C. The string supply unit 22 supplies the string 58 on the inside and the string 58 on the outside at the individual speeds to the core metal 60. Then, the string 58 that is attached inside the core metal 60 by applying pressure is not creased and thus, a bent part 70C of the first intermediate molded body 70 formed by the strings 58 is not creased either.

After step S1, the first intermediate molded body 70 is formed on each attachment surface 62. Between the adjacent first intermediate molded bodies 70, the split lines 72 are formed at the positions of the guided portions 64. In step S2, each first intermediate molded body 70 is released from the core metal 60 using the split lines 72 as a border. In the present embodiment, two first intermediate molded bodies 70A, 70B are released from the core metal 60.

Figure 8:
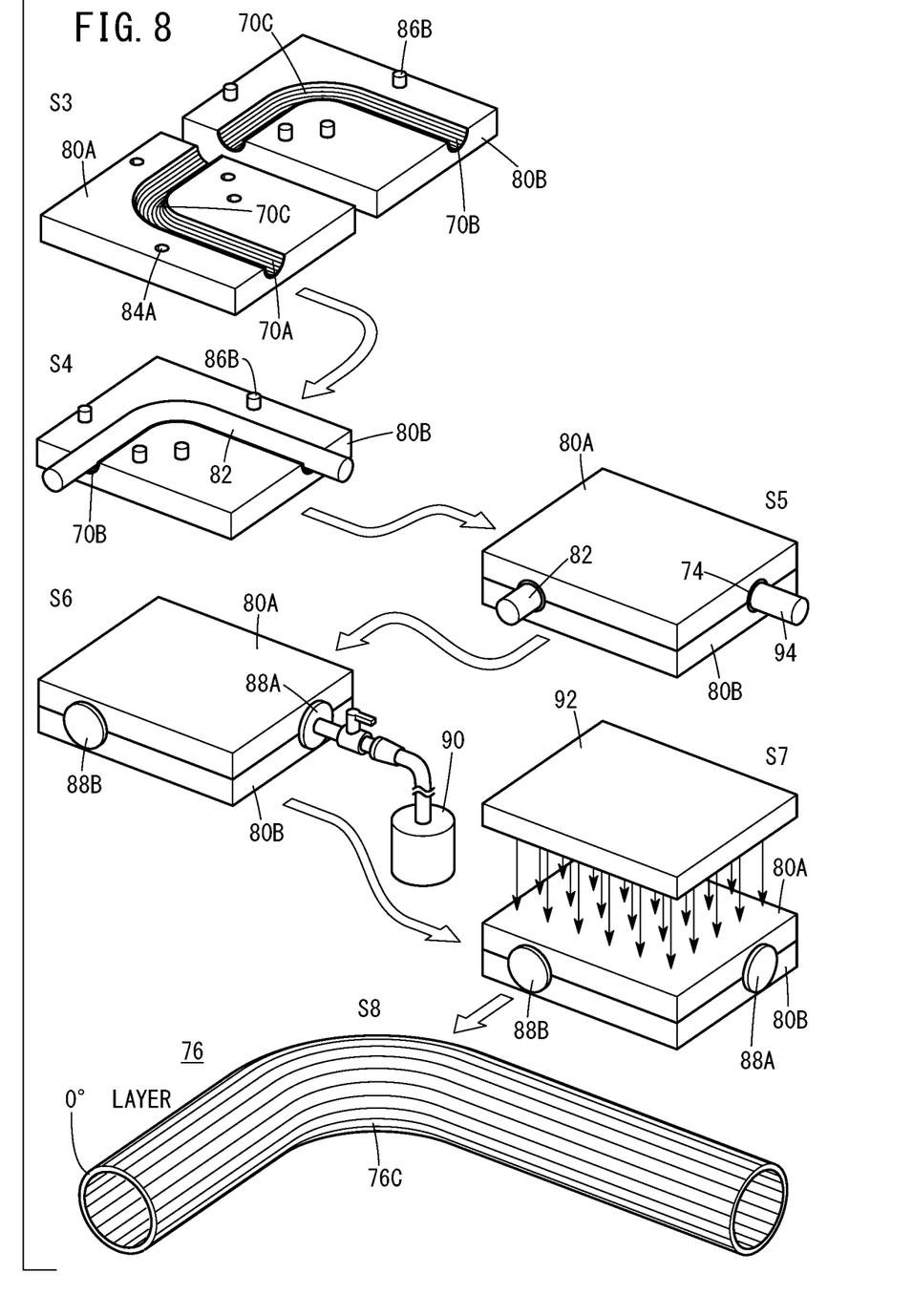
FIG. 8 is a diagram for describing a manufacturing method 1 for a shaft-shaped composite member including the first intermediate molded body.

After step S2, a pair of dies 80A, 80B are prepared in step S3 as illustrated in FIG. 8. One die 80A is provided with a cavity having the same shape as that of one first intermediate molded body 70A, and the other die 80B is provided with a cavity having the same shape as that of the other first intermediate molded body 70B. Here, the one first intermediate molded body 70A is fitted to the cavity of the die 80A, and the other first intermediate molded body 70B is fitted to the cavity of the die 80B.

After step S3, a tube-shaped bag 82 made of nylon or rubber is fitted to the inner circumferential side of the first intermediate molded body 70B (which may be the first intermediate molded body 70A) fitted to the die 80B in step S4.

After step S4, the die 80A and the die 80B are closed in step S5. The die 80A includes a plurality of holes 84A for positioning, and the die 80B includes a plurality of pins 86B for positioning. When the dies 80A, 80B are closed, the pins 86B of the die 80B are inserted into the holes 84A of the die 80A. When the dies 80A, 80B are closed, the two first intermediate molded bodies 70A, 70B are combined between the dies 80A, 80B to form a second intermediate molded body 74.

After step S5, a first plug 88A is provided to one end of the tube-shaped bag 82 and a second plug 88B is provided to the other end thereof in step S6. The first plug 88A is connected to an air pump 90, and the air with 0.6 MPa is supplied from the air pump 90 into the tube-shaped bag 82.

After step S6, the first plug 88A is closed and the second intermediate molded body 74 is heated in a heating device 92 such as a furnace together with the dies 80A, 80B in step S7. In this heating, the inner circumference of the second intermediate molded body 74 is pressurized by the tube-shaped bag 82. When the heating process is performed for a predetermined time at a predetermined temperature (predetermined temperature change), the second intermediate molded body 74 is hardened.

After step S7, the shaft-shaped composite member 76 formed by hardening the second intermediate molded body 74 is released from the dies 80A, 80B in step S8. Since the first intermediate molded body 70 without the creases in the bent part 70C is obtained in step S1, a bent part 76C of the shaft-shaped composite member 76 is not creased either. The shaft-shaped composite member 76 includes one fiber reinforced resin material layer, that is, a layer where the strings 58 (fibers) are arranged in one direction (axial direction), that is, a 0° layer.

[2. 2 Manufacturing Method 2]

Figure 9:
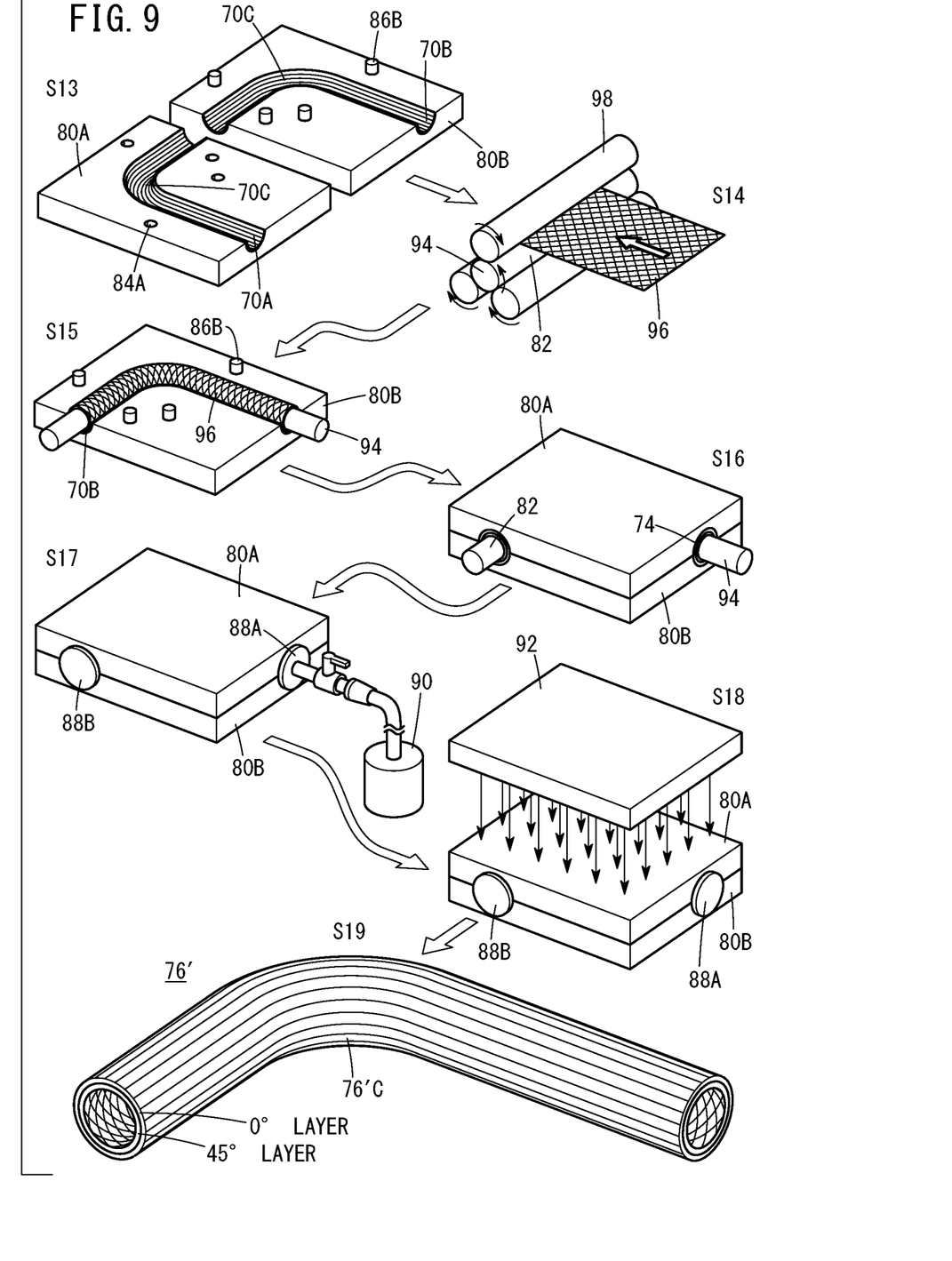
FIG. 9 is a diagram for describing a manufacturing method 2 for a shaft-shaped composite member including the first intermediate molded body.

It is the shaft-shaped composite member 76 including one fiber reinforced resin material layer that is manufactured by the manufacturing method 1. However, in order to reduce the damage in the bending and twisting that occur at the same time, it is preferable to use a plurality of fiber reinforced resin material layers in which fibers are arranged in different directions. With reference to FIG. 9, description is given concerning a manufacturing method for the shaft-shaped composite member 76' including the fiber reinforced resin material layers.

Among step S13 to step S19 in FIG. 9, step S13 and step S15 to step S19 are substantially the same as step S3 to step S8 in FIG. 8. Therefore, the detailed description of those steps is omitted. It is step S14 that is unique in a series of steps in FIG. 9.

After step S1 and step S2 in FIG. 7 are sequentially performed, the one first intermediate molded body 70A is fitted into the cavity of the die 80A and the other first intermediate molded body 70B is fitted into the cavity of the die 80B in step S13.

After step S13, a resin core member 94 is covered with the tube-shaped bag 82 made of nylon or rubber, and a prepreg 96 in a sheet shape as a 45° layer is wound around a surface of the tube-shaped bag 82 by a sheet winding (SW) method in step S14. Here, the resin core member 94 covered with the tube-shaped bag 82 is held by three rolls 98 and the rolls 98 are rotated. This rotation causes the resin core member 94 to rotate so that the prepreg 96 is wound around the surface of the tube-shaped bag 82.

Instead of winding the prepreg 96 in the sheet shape around the surface of the tube-shaped bag 82 by the sheet winding (SW) method, the string 58 may be wound by a filament winding (FW) method.

After step S14, the resin core member 94 is fitted to the inner circumferential side of the first intermediate molded body 70B (which may be first intermediate molded body 70A) fitted into the die 80B in step S15, and then the dies are closed in step S16. In this case, the two first intermediate molded bodies 70A, 70B are combined between the dies 80A, 80B, and thus, the second intermediate molded body 74 is formed. In step S17, the resin core member 94 is extracted, the first plug 88A and the second plug 88B are attached to both ends of the tube-shaped bag 82, and the air with 0.6 MPa is supplied into the tube-shaped bag 82. In step S18, a heating process is performed for a predetermined time at a predetermined temperature (predetermined temperature change), and in step S19, the shaft-shaped composite member 76' is released from the dies 80A, 80B.

The shaft-shaped composite member 76' includes the layer of the prepreg 96 on the inside, that is, the 45° layer and the layer of the strings 58 on the outside, that is, the 0° layer. Therefore, the shaft-shaped composite member 76' has a function of the shaft-shaped composite member 76 illustrated in FIG. 8 and moreover a function of the prepreg 96. For example, a bending load or a twisting load acts on a handlebar of a bicycle. The shaft-shaped composite member 76' has the rigidity of the 45° layer against the twisting load and the rigidity of the 0° layer against the bending load.

[3. Summary of the Present Embodiment]

The manufacturing apparatus 100 for the shaft-shaped composite member 76 (and shaft-shaped composite member 76', which will be omitted below) according to the present embodiment includes the core metal 60 including the bent part 60C, and the string supply device 10 configured to supply the plurality of strings 58, and manufactures the shaft-shaped composite member 76 (first intermediate bodies 70) including the bent part 76C (and bent part 76'C, which will be omitted below) by attaching the strings 58 to the core metal 60. The core metal 60 includes, on the outer circumference thereof, the plurality of attachment surfaces 62 to which the strings 58 are attached, and the plurality of guided portions 64 formed along the axial direction of the core metal 60 and disposed between two of the attachment surfaces 62. The string supply device 10 includes the string supply unit 22 configured to supply the strings 58 to the outer circumference of the core metal 60, the attaching unit 40 configured to arrange and attach the strings 58 on the attachment surfaces 62 of the core metal 60 in the circumferential direction of the core metal 60, and the plurality of guiding units 50 in contact with the guided portions 64 of the core metal 60, configured to guide the core metal 60.

When the strings 58 are attached to the core metal 60, the guiding units 50 provided in the string supply device 10 are in contact with the guided portions 64 provided on the core metal 60, and guide the core metal 60. Each guiding unit 50 also functions as a separator; therefore, the strings 58 are attached to the attachment surfaces 62 at the entire circumference of the core metal 60 except the guided portions 64. By this manufacturing apparatus 100, the first intermediate molded bodies 70 of the shaft-shaped composite member 76 are manufactured. The split lines 72 to which the strings 58 are not attached are formed from the one end 60A to the other end 60B of the first intermediate molded bodies 70 along the axial direction, and the first intermediate molded bodies 70 can be split using the split lines 72 as borders. In addition, after the core metal 60 is removed from the first intermediate molded bodies 70, the first intermediate molded bodies 70 can be combined to manufacture the second intermediate molded body 74 that is hollow. By the above structure, since the core metal 60 can be removed from the first intermediate molded bodies 70, the shaft-shaped composite member 76 manufactured finally can be reduced in weight. In addition, by performing the step of attaching the strings 58 to the core metal 60 once, the first intermediate molded bodies 70 can be manufactured and the first intermediate molded bodies 70 are combined to manufacture the second intermediate molded body 74 that is hollow. Accordingly, the work efficiency is high.

In the present embodiment, the guiding unit 50 is the guide pin with the tapered part 52 that is tapered toward an end thereof. The guided portion 64 is the groove, and when the strings 58 are attached to the core metal 60, the groove and the tapered part 52 are in contact with each other. By the above structure, the tapered part 52 of the guide pin can easily enter the groove and the space is not formed easily between the guiding unit 50 and the guided portion 64. Therefore, the portions (split lines 72) where the strings 58 are not attached can be formed on the outer circumferential surface of the core metal 60.

In the present embodiment, the string supply unit 22 may be configured to supply each string 58 to the core metal 60 at an individual speed. By the above structure, when the strings 58 are attached to the bent part 60C of the core metal 60, the supply speed of the string 58 to be attached to the outside of the bent part 60C and the supply speed of the string 58 to be attached to the inside of the bent part 60C can be changed. Therefore, the bent part 70C of the first intermediate molded body 70 and the bent part 76C of the shaft-shaped composite member 76 corresponding to a final product are not creased easily.

In the present embodiment, the strings 58 may form a fiber reinforced resin material with adhesiveness, in which a long fiber tow including fiber filaments contains a matrix material. By the above structure, the strings 58 can be attached to the core metal 60 without applying an adhesive or the like to the strings 58 or the core metal 60. Since the adjacent strings 58 are attached to each other, the shape of the first intermediate molded bodies 70 can be maintained even after the core metal 60 is removed.

In the present embodiment, the attaching unit 40 includes the guide hole 44 into which the core metal 60 and the strings 58 are inserted. The guiding units 50 may protrude to a central direction from the edge of the guide hole 44. By the above structure, the strings 58 can be attached to the attachment surfaces 62 of the core metal 60 through a simple work of inserting the core metal 60 into the guide hole 44. In addition, the portions (split lines 72) where the strings 58 are not attached can be formed on the outer circumferential surface of the core metal 60.

The shaft-shaped composite member 76 according to the present embodiment includes the support unit 30 mounted on the string supply unit 22 and configured to support the attaching unit 40 below the string supply unit 22.

In the present embodiment, the string supply unit 22 includes the first plate material 24 with an annular shape, and the plurality of restriction pins 26 provided on the first upper surface 24F of the first plate material 24. The first plate material 24 includes at the center, the first hole 28 with a circular shape that penetrates in the vertical direction. The restriction pins 26 are provided on the inner and outer edges of the first upper surface 24F, are arranged in a line along the circumferential direction of the first plate material 24, and gather the strings 58 supplied from outside the first plate material 24 into the first hole 28.

The manufacturing method for the shaft-shaped composite member 76 according to the present embodiment includes: the step of manufacturing the plurality of first intermediate molded bodies 70 by arranging the strings 58 in the circumferential direction of the core metal 60 and attaching the strings 58 to the plurality of attachment surfaces 62 of the core metal 60 along the axial direction of the core metal 60, and moreover forming the split lines 72 where the strings 58 are not attached between the attachment surfaces 62 that are adjacent to each other along the axial line of the core metal 60 (step S1 in FIG. 7); the step of releasing each of the first intermediate molded bodies 70 from the core metal 60 using the split lines 72 as borders (step S2 in FIG. 7); the step of manufacturing the second intermediate molded body 74 by combining the first intermediate molded bodies 70 (step S5 in FIG. 8, step S16 in FIG. 9); and the step of forming the shaft-shaped composite member 76 by pressurizing and heating the second intermediate molded body 74 for hardening (step S7 in FIG. 8, step S18 in FIG. 9).

Note that the manufacturing apparatus and the manufacturing method for a shaped-shaped composite member according to the present invention are not limited to those described in the above embodiment, and can employ various structures without departing from the concept of the present invention.

What is claimed is:

1. A manufacturing apparatus for a shaft-shaped composite member including a bent part, comprising a core metal including a bent part and to which a plurality of strings become attached, a string supply device configured to supply the plurality of strings, and a core metal movement device configured to move the core metal, wherein: the core metal includes, on an outer circumference thereof, a plurality of attachment surfaces to which the strings are attached, and a plurality of guided portions formed along an axial direction of the core metal and disposed between two of the attachment surfaces; and the string supply device includes a string supply unit configured to supply the strings to the outer circumference of the core metal, an attacher configured to arrange and attach the strings on the attachment surfaces of the core metal in a circumferential direction of the core metal, and a plurality of guides in contact with the guided portions of the core metal, configured to guide the core metal the attacher includes a guide hole into which the core metal and the strings are inserted, the guides protrude to a central direction from an edge of the guide hole and have ends respectively in contact with the guided portions, the core metal movement device moves the core metal to pass the guide hole, and a plurality of split lines where the strings are not attached are formed along the guided portions due to the plurality of guides respectively in contact with the guided portions of the core metal while the string supply device supplies the strings to the outer circumference of the core metal passing the guide hole.

2. The manufacturing apparatus for the shaft-shaped composite member according to claim 1, wherein:
   each of the guides is a guide pin with a tapered part that is tapered toward an end thereof;
   the guided portion is a groove; and
   when the strings are attached to the core metal, the groove and the tapered part are in contact with each other.

3. The manufacturing apparatus for the shaft-shaped composite member according to claim 1, wherein the string supply unit is configured to supply each string to the core metal at an individual speed.

4. The manufacturing apparatus for the shaft-shaped composite member according to claim 1, wherein the strings form a fiber reinforced resin material with adhesiveness, in which a long fiber tow including fiber filaments contains a matrix material.

5. The manufacturing apparatus for the shaft-shaped composite member according to claim 1, further comprising a support unit mounted on the string supply unit and configured to support the attacher below the string supply unit.

6. The manufacturing apparatus for the shaft-shaped composite member according to claim 1, wherein:

the string supply unit includes a plate material with an annular shape, and a plurality of restriction pins provided on an upper surface of the plate material;

the plate material includes at a center, a hole with a circular shape that penetrates in a vertical direction; and the restriction pins are provided on inner and outer edges of the upper surface, are arranged in a line along a circumferential direction of the plate material, and gather the strings supplied from outside the plate material into the hole.

* * * * *